(12) United States Patent
Birecki et al.

(10) Patent No.: US 10,579,160 B2
(45) Date of Patent: Mar. 3, 2020

(54) MOBILE IMAGING DEVICE

(71) Applicant: HEWLETT-PACKARD DEVELOPMENT COMPANY, L.P., Houston, TX (US)

(72) Inventors: Henryk Birecki, Palo Alto, CA (US); Omer Gila, Palo Alto, CA (US); Napoleon J. Leoni, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/196,891

(22) Filed: Nov. 20, 2018

(65) Prior Publication Data
US 2019/0087018 A1    Mar. 21, 2019

Related U.S. Application Data

(62) Division of application No. 15/114,434, filed as application No. PCT/US2014/014314 on Jan. 31, 2014, now Pat. No. 10,162,430.

(51) Int. Cl.
*G06F 3/03* (2006.01)
*G06F 3/14* (2006.01)
(Continued)

(52) U.S. Cl.
CPC .......... *G06F 3/0312* (2013.01); *G02F 1/167* (2013.01); *G06F 3/0346* (2013.01);
(Continued)

(58) Field of Classification Search
None
See application file for complete search history.

(56) References Cited

U.S. PATENT DOCUMENTS 5,866,284 A    2/1999   Vincent
6,333,754 B1   12/2001  Oba et al.
(Continued)

FOREIGN PATENT DOCUMENTS

CN    102662895    9/2012
TW    TWM447525    2/2013
(Continued)

OTHER PUBLICATIONS

Kuo, Ye-Sheng, et al. "Hijacking power and bandwidth from the mobile phone's audio interface." Proceedings of the First ACM Symposium on Computing for Development. ACM, 2010.
(Continued)

*Primary Examiner* — Aneeta Yodichkas
(74) *Attorney, Agent, or Firm* — Dicke Billig & Czaja PLLC

(57) ABSTRACT

One example of a mobile imaging device includes a single ion source, a ground connector, and an interface. The single ion source is to erase and write to an electronic paper display by depositing charges onto an imaging surface of the electronic paper display as the imaging device and the electronic paper display are moved relative to each other. The electronic paper display includes a ground return path. The ground connector maintains an electrical connection to the ground return path as the imaging device and the electronic paper display are moved relative to each other during erasing or writing to the electronic paper display. The interface is for transferring data between the imaging device and a computing device.

20 Claims, 12 Drawing Sheets

(51) Int. Cl.
*G06F 3/0346* (2013.01)
*G06F 3/038* (2013.01)
*G02F 1/167* (2019.01)
*G02F 1/1676* (2019.01)
*G09G 3/00* (2006.01)
*G09G 3/34* (2006.01)
*G09G 5/393* (2006.01)

(52) U.S. Cl.
CPC .............. *G06F 3/0383* (2013.01); *G06F 3/14* (2013.01); *G09G 3/001* (2013.01); *G09G 3/344* (2013.01); *G09G 5/393* (2013.01); *G02F 1/1676* (2019.01); *G09G 2354/00* (2013.01); *G09G 2356/00* (2013.01); *G09G 2370/16* (2013.01); *G09G 2380/14* (2013.01)

(56) References Cited

U.S. PATENT DOCUMENTS

| | | | |
|---|---|---|---|
| 6,515,790 | B2 | 2/2003 | Miyamoto et al. |
| 6,982,734 | B2 | 1/2006 | Pan |
| 7,140,550 | B2 | 11/2006 | Ramachandran |
| 7,580,845 | B2 | 8/2009 | Burman |
| 8,144,388 | B2 | 3/2012 | Ogawa |
| 8,514,256 | B2 | 8/2013 | Ogawa et al. |
| 2003/0067427 | A1 | 4/2003 | Comiskey et al. |
| 2005/0134550 | A1 | 6/2005 | Schmitz |
| 2006/0017659 | A1 | 1/2006 | Ogawa et al. |
| 2007/0045399 | A1 | 3/2007 | Martin |
| 2009/0021495 | A1 | 1/2009 | Edgecomb et al. |
| 2011/0298760 | A1 | 12/2011 | Gila et al. |
| 2012/0052910 | A1 | 3/2012 | Mu et al. |
| 2012/0098803 | A1 | 4/2012 | Chang |
| 2012/0206341 | A1 | 8/2012 | Gila |
| 2012/0320001 | A1 | 12/2012 | Gila et al. |
| 2013/0003162 | A1 | 1/2013 | Leoni et al. |
| 2013/0107144 | A1 | 5/2013 | Marhefka et al. |
| 2013/0235446 | A1 | 9/2013 | Leoni et al. |
| 2013/0315406 | A1 | 11/2013 | Choi et al. |
| 2014/0210805 | A1 | 7/2014 | Birecki et al. |
| 2014/0239068 | A1 | 8/2014 | Park |
| 2014/0253426 | A1 | 9/2014 | Leoni et al. |

FOREIGN PATENT DOCUMENTS

| | | |
|---|---|---|
| WO | WO-2005001676 | 1/2005 |
| WO | WO-2013187531 | 12/2013 |

OTHER PUBLICATIONS

Hijacking Power an Bandwidth from the Mobile Phone's Audio Interface Ye-Sheng Kuo, Sonal Verma, Thomas Schmid, and Prabal Dutta.

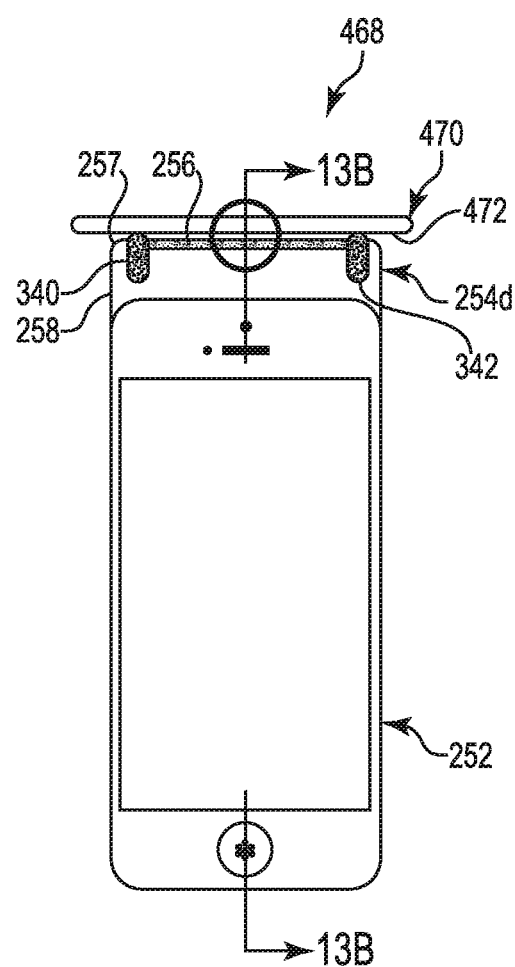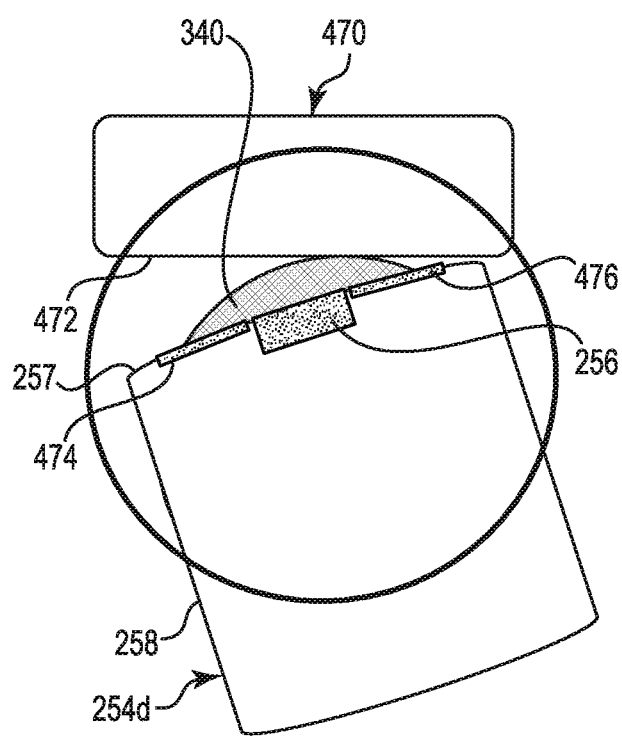
Fig. 13A
Fig. 13B

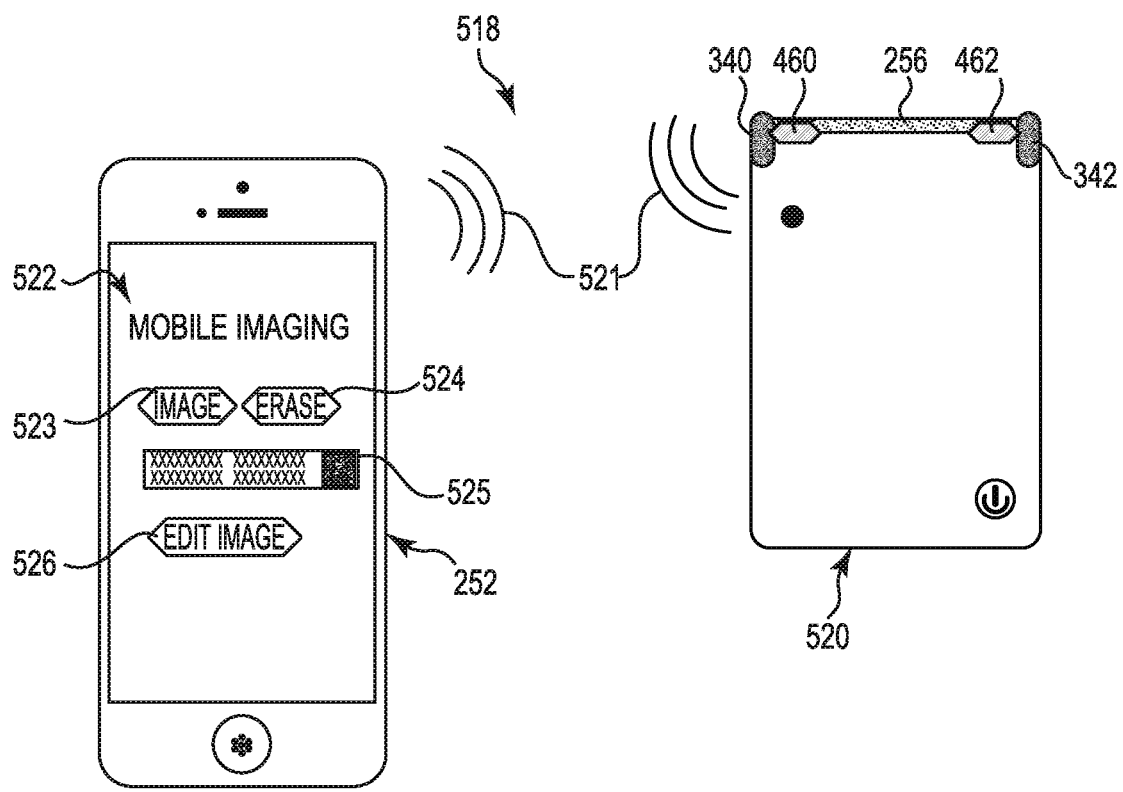
Fig. 15A
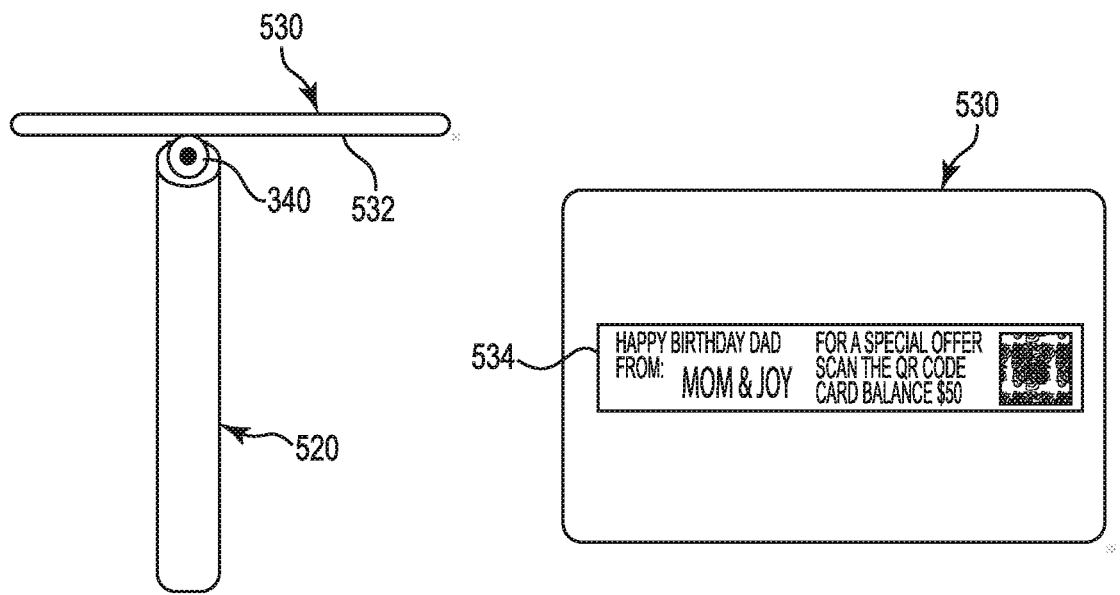
Fig. 15B
Fig. 15C

MOBILE IMAGING DEVICE

CROSS-REFERENCE TO RELATED APPLICATIONS

This patent application is a Divisional of U.S. application Ser. No. 15/114,434, which entered National Stage Jul. 27, 2016 based on PCT/US2014/014314, filed Jan. 31, 2014 both of which are incorporated by reference herein.

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

BRIEF DESCRIPTION OF THE DRAWINGS

FIGS. 13A-13B illustrate another example of a mobile imaging system including a smartphone with an attached mobile imaging device.

FIG. 15A illustrates one example of a mobile imaging system including a smartphone with a separate mobile imaging device.

FIG. 15B illustrates one example of a mobile imaging device during erasing or writing.

FIG. 15C illustrates one example of a display device after writing.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Electronic paper ("e-paper") is used in a variety of display applications such as signage, e-books, tablets, cards, posters, and pricing labels. E-paper has several paper-like features. For example, e-paper is a reflective display that uses ambient light as an illumination source. The ambient light strikes the surface and is reflected to the viewer. The usage of pigments similar to those that are used in printing allows the e-paper to be read at a wide range of angles and lighting conditions, including full sunlight. The use of ambient light also eliminates the need for illumination produced by the device, such as a backlight. This minimizes the power used by the e-paper. In addition, the e-paper does not use power to maintain the image. Once the image is written, the image remains on the e-paper for an extended period of time or until the e-paper is rewritten. Thus, a typical e-paper primarily uses power for changing the optical state of the e-paper.

E-paper is typically written by generating a charge on a surface in proximity to a layer of microcapsules that contain charged pigment particles. The charge on the surface attracts or repels the charged pigment particles in the microcapsules to create the desired image. No physical supplies (e.g., ink) are used for writing to e-paper and the power used to write to e-paper is low.

The following disclosure describes several examples of mobile imaging devices suitable for on the go imaging in a mobile environment, such as for a street vendor or for an in store customer representative. The mobile imaging devices communicate with a computing device, such as a smartphone, tablet, or laptop computer, for transferring data between the computing device and the mobile imaging device. The mobile imaging devices can erase and write to an e-paper display device. The e-paper display devices may include gift cards, prepaid cards, credit cards, shelf tags, boarding passes, shipping labels, large format flexible rewritable displays, or other suitable display devices. The e-paper display devices are erased and written to by receiving charges on an imaging surface of the e-paper display from the mobile imaging device.

Figure 1:
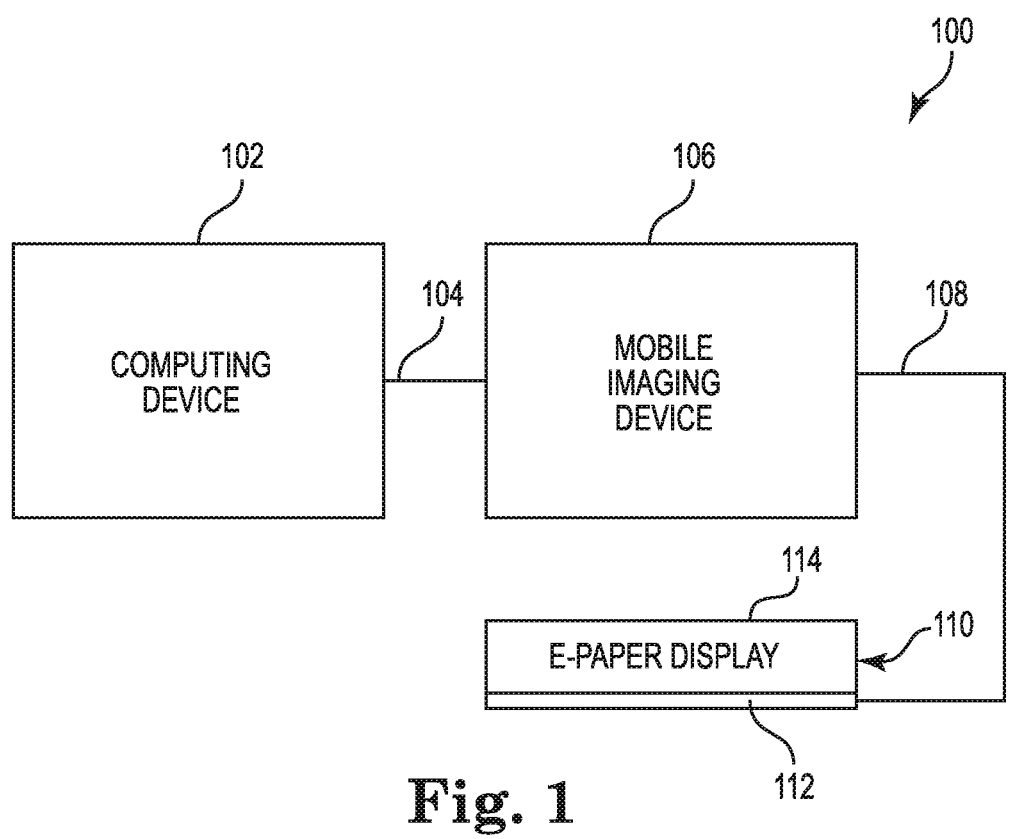
FIG. 1 illustrates one example of a mobile imaging system.

FIG. 1 illustrates one example of a mobile imaging system 100. Mobile imaging system 100 includes a computing device 102, a mobile imaging device 106, and an e-paper display 110. Computing device 102 is communicatively coupled to mobile imaging device 106 through a communication link 104. In one example, communication link 104 is a wired communication link, such as a Universal Serial Bus (USB) link, an audio jack link, or another suitable wired communication link. In another example, communication link 104 is a wireless communication link, such as a WiFi link, a Bluetooth link, a Near field Communication (NFC) link, or another suitable wireless communication link.

Computing device 102 includes a smartphone, tablet, laptop computer, or other suitable device. Computing device 102 communicates with mobile imaging device 106 to provide data and instructions to the mobile imaging device for erasing and writing to e-paper display 110. Mobile imaging device 106 receives the data and instructions from computing device 102 and erases and/or writes to e-paper display 110 in response to the instructions and data. Prior to and during erasing or writing to e-paper display 110, mobile imaging device 106 is electrically coupled to e-paper display 110 through ground connection 108. Once e-paper display 110 has been erased and/or written, ground connection 108 may be removed.

E-paper display 110 includes an active layer that switches color when a magnetic field or electrical charges are applied to an imaging surface 114 of e-paper display 110. In one example, the active layer contains a switchable pigment or die combination. A resin or polymer may be used to encapsulate the active layer. One example of e-paper display 110 is further described below with reference to FIG. 6.

E-paper display 110 includes a ground return path including a ground electrode 112, which provides a counter-electrode for the imaging of e-paper display 110 by mobile imaging device 106. Ground electrode 112 and ground connection 108 allow counter charges to flow to ground electrode 112 from mobile imaging device 106. Thus, e-paper display 110 remains basically charge neutral despite charges being ejected onto imaging surface 114. Without a connection between ground electrode 112 and mobile imaging device 106, no appreciable amount of charges can be ejected onto imaging surface 114 and thus no information can be written to e-paper display 110.

Figure 2:
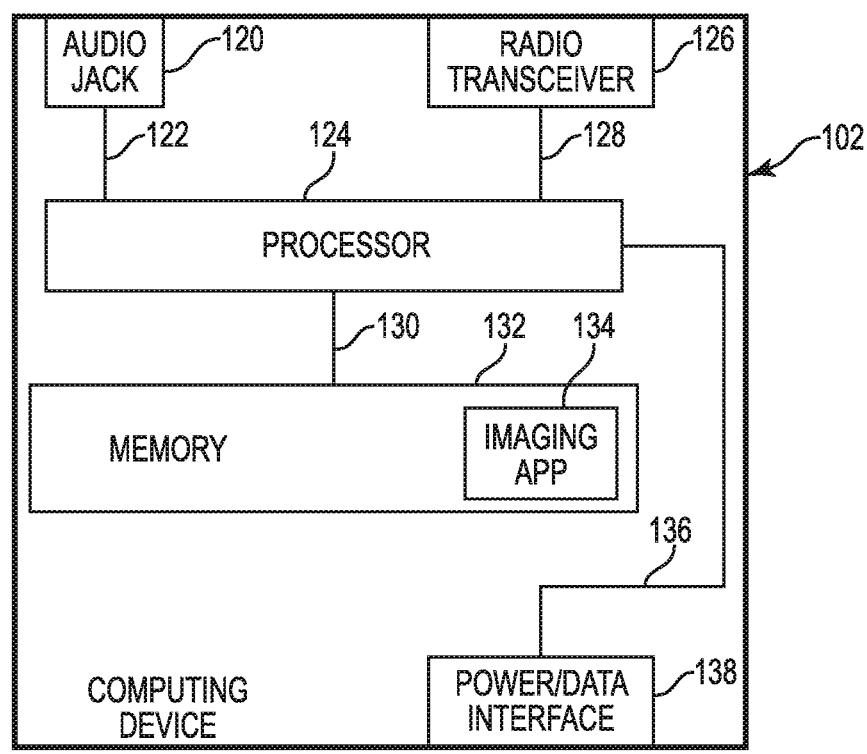
FIG. 2 illustrates one example of a computing device for mobile imaging.

FIG. 2 illustrates one example of a computing device 102 for mobile imaging. Computing device 102 includes an audio jack 120, a processor 124, a radio transceiver 126, a memory 132, and a power/data interface 138. Audio jack 120 is communicatively coupled to processor 124 through a communication link 122. Processor 124 is communicatively coupled to radio transceiver 126 through a communication link 128, to memory 132 through a communication link 130, and to power/data interface 138 through a communication link 136.

Processor 124 includes a Central Processing Unit (CPU) or another suitable processor. In one example, memory 132 stores instructions executed by processor 124 for operating computing device 102. Memory 132 includes any suitable combination of volatile and/or non-volatile memory, such as combinations of Random Access Memory (RAM), Read-Only Memory (ROM), flash memory, and/or other suitable memory. Memory 132 stores instructions executed by processor 124 including instructions for an imaging application 134. In one example, processor 124 executes instructions of imaging application 134 to control a mobile imaging device for erasing and/or writing to an e-paper display.

Audio jack 120 includes a left audio output channel, a right audio output channel, and a microphone input channel. In one example, audio jack 120 is used to exchange data with and/or to provide power to a mobile imaging device. Radio transceiver 126 is a wireless communication interface and includes a WiFi transceiver, a Bluetooth transceiver, a NFC transceiver, and/or another suitable radio transceiver. In one example, radio transceiver 126 is used to exchange data with a mobile imaging device. Power/data interface 138 includes a USB interface, a mini USB interface, or another suitable power/data interface. In one example, power/data interface 138 is used to exchange data with and/or to provide power to a mobile imaging device.

Computing device 102 may include other components not specifically illustrated in FIG. 2, such as a power source (e.g., a battery), a display, a speaker, and an input device (e.g., a touchscreen and/or keyboard). For example, computing device 102 can be a smartphone, a tablet, a laptop computer, or another suitable computing device capable of communicating with a mobile imaging device for erasing and writing to an e-paper display.

Figure 3A:
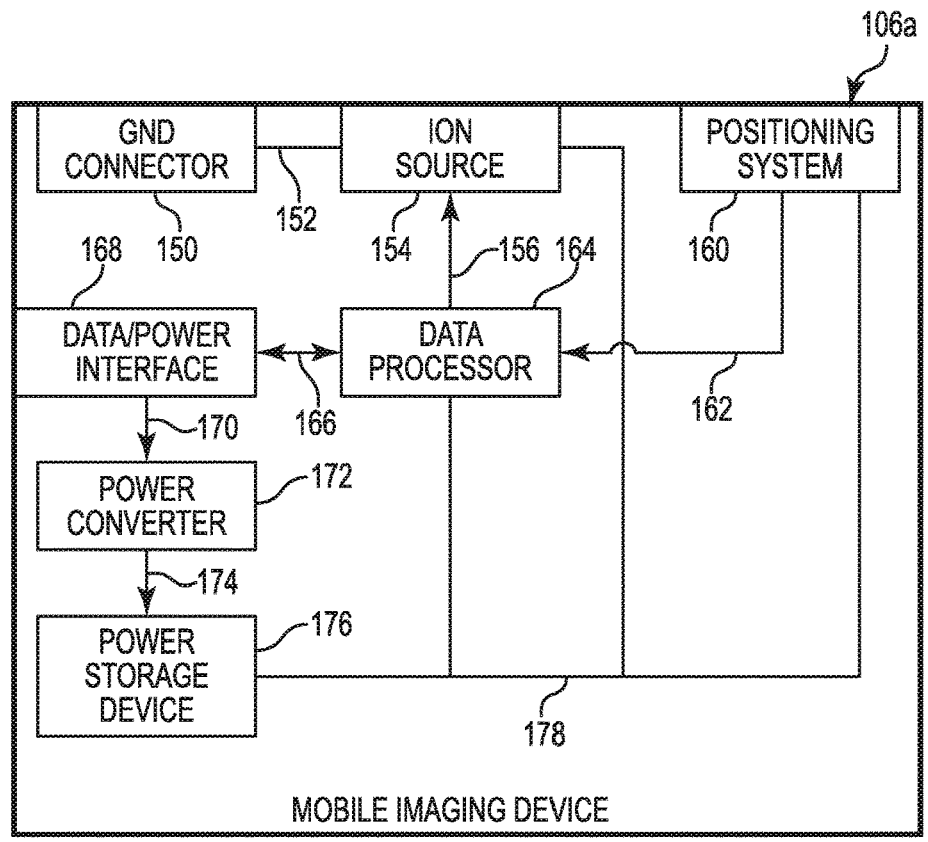
FIG. 3A illustrates one example of a mobile imaging device.

FIG. 3A illustrates one example of a mobile imaging device 106a. Mobile imaging device 106a includes a ground connector 150, an ion source 154, a positioning system 160, a data processor 164, a data/power interface 168, a power converter 172, and a power storage device 176. Ground connector 150 is electrically coupled to ion source 154 through a signal path 152. Ion source 154 is electrically coupled to data processor 164 through a communication link 156. Data processor 164 is electrically coupled to data/power interface 168 through a communication link 166 and to positioning system 160 through a communication link 162. Data/power interface 168 is electrically coupled to power converter 172 through a signal path 170. Power converter 172 is electrically coupled to power storage device 176 through a signal path 174. Power storage device 176 is electrically coupled to data processor 164, ion source 154, and positioning system 160 through a signal path 178.

Data processor 164 processes data received from data/power interface 168 and position data from positioning system 160 to control ion source 154 to erase and/or write to an e-paper display. Data processor 164 may send data to data/power interface 168 for transmission to a computing device. The data sent to a computing device may be status information for mobile imaging device 106a and/or information related to an e-paper display being imaged.

Ground connector 150 is connected to the ground return path of an e-paper display when erasing and/or writing to the e-paper display. Ion source 154 is an addressable ion source that selectively deposits charges onto the imaging surface of an e-paper display to erase and/or write to the e-paper display. In one example, a single ion source (e.g., a corona wire) is used for both erasing and writing to an e-paper display by being able to emit both negative ions (or electrons) and positive ions. The single ion source can be set to a first appropriate potential (e.g., negative) to erase the contents of the e-paper display in a first pass over the e-paper display and then set to a second appropriate potential (e.g., positive) to write to the e-paper display in a second pass over the e-paper display. In another example, ion source 154 includes a first ion source for emitting negative ions and a second ion source for emitting positive ions.

Positioning system 160 determines the position of mobile imaging device 106a relative to an e-paper display during erasing and writing to the e-paper display. In one example, positioning system 160 includes a rotary encoder to sense the incremental position of mobile imaging device 106a as the mobile imaging device is moved relative to an e-paper display. In another example, positioning system 160 includes dual Charge-Coupled Device (CCD) cameras for optically sensing the incremental position and rotation of mobile imaging device 106a as the mobile imaging device is moved relative to an e-paper display. In this example, the e-paper display may include non-visible markings (e.g., markings visible in the Infrared (IR) range) to provide a pattern that can be used to sense the position of mobile imaging device 106a relative to the e-paper display. In another example, positioning system 160 includes dual capacitive sensors to sense the tilt of mobile imaging device 106a relative to an e-paper display. In this example, the sensed tilt can be used to compensate for current from different areas of ion source 154 that may have different spacings to the e-paper display ground return path and thus different extraction fields. In other examples, positioning system 160 can include combinations of the above described components and/or other components suitable for tracking the position of ion source 154 of mobile imaging device 106a relative to an e-paper display during erasing and writing to the e-paper display.

Data/power interface 168 receives data and power from a computing device for operating mobile imaging device 106a and may transmit data to a computing device. In one example, the data and power are received from an audio jack of a computing device, such as audio jack 120 of computing device 102 previously described and illustrated with reference to FIG. 2. In another example, the data and power are received from a power/data interface of a computing device, such as power/data interface 138 of computing device 102 previously described and illustrated with reference to FIG. 2. The data and power signals can be received by data/power interface 168 separately or combined. For example, data and power may be transmitted using frequency modulation of data on a power carrier signal. Data/power interface 168 extracts and sends the data signals to data processor 164 and the power signals to power converter 172. Data/power interface 168 may receive data from data processor 164 and transmit the data to a computing device.

Power converter 172 receives the power signals from data/power interface 168 and converts the signals to charge power storage device 176. In one example, power converter 172 rectifies a power carrier signal to charge power storage device 176. Power storage device 176 is a battery, super capacitor, or other suitable power storage device that stores enough power for mobile imaging device 106a to erase and write to an e-paper display once or multiple times.

Figure 3B:
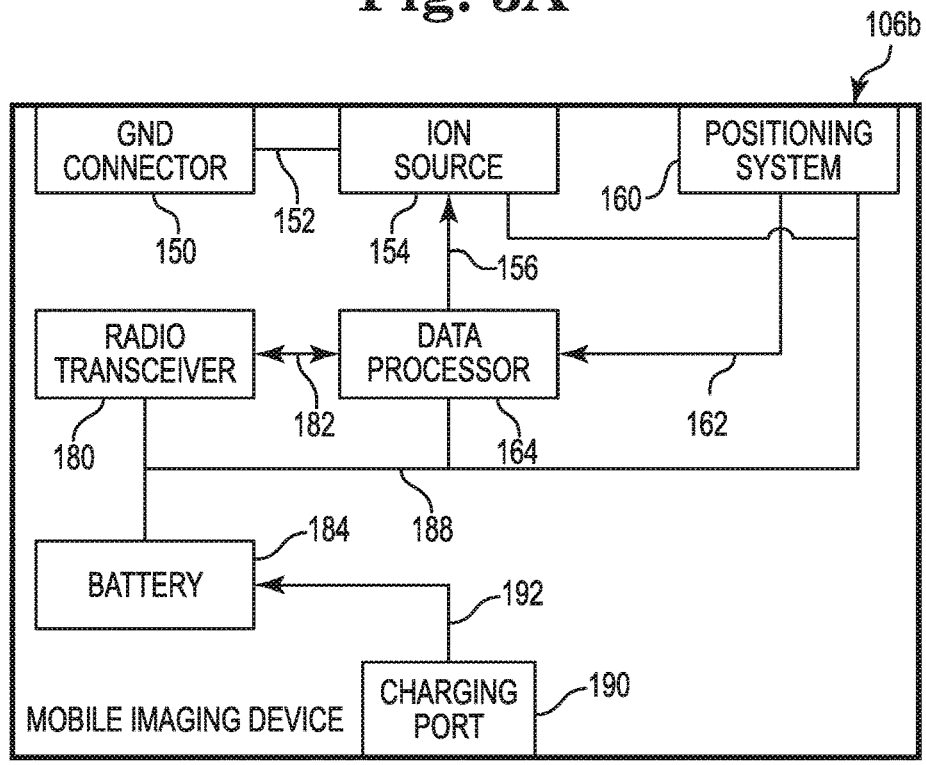
FIG. 3B illustrates another example of a mobile imaging device.

FIG. 3B illustrates another example of a mobile imaging device 106b. Mobile imaging device 106b includes a ground connector 150, an ion source 154, a positioning system 160, a data processor 164, a radio transceiver 180, a battery 184, and a charging port 190. Ground connector 150 is electrically coupled to ion source 154 through signal path 152. Ion source 154 is electrically coupled to data processor 164 through communication link 156. Data processor 164 is electrically coupled to radio transceiver 180 through a communication link 182 and to positioning system 160 through communication link 162. Charging port 190 is electrically coupled to battery 184 through a signal path 192. Battery 184 is electrically coupled to radio transceiver 180, data processor 164, ion source 154, and positioning system 160 through a signal path 188.

Data processor 164 processes data received from radio transceiver 180 and position data from positioning system 160 to control ion source 154 to erase and/or write to an e-paper display. Data processor 164 may send data to radio transceiver 180 for transmission to a computing device. The data sent to a computing device may be status information for mobile imaging device 106b and/or information related to an e-paper display being imaged.

Ground connector 150, ion source 154, and positioning system 160 were previously described with reference to FIG. 3A. Radio transceiver 180 is a wireless communication interface and includes a WiFi transceiver, a Bluetooth transceiver, a NFC transceiver, or another suitable radio transceiver for receiving data from a computing device and for transmitting data to a computing device. In one example, radio transceiver 180 establishes a wireless communication link with radio transceiver 126 of computing device 102 previously described and illustrated with reference to FIG. 2. Charging port 190 is connected to a power source for charging battery 184. Battery 184 stores enough power for mobile imaging device 106b to erase and write to an e-paper display once or multiple times.

Figure 4A:
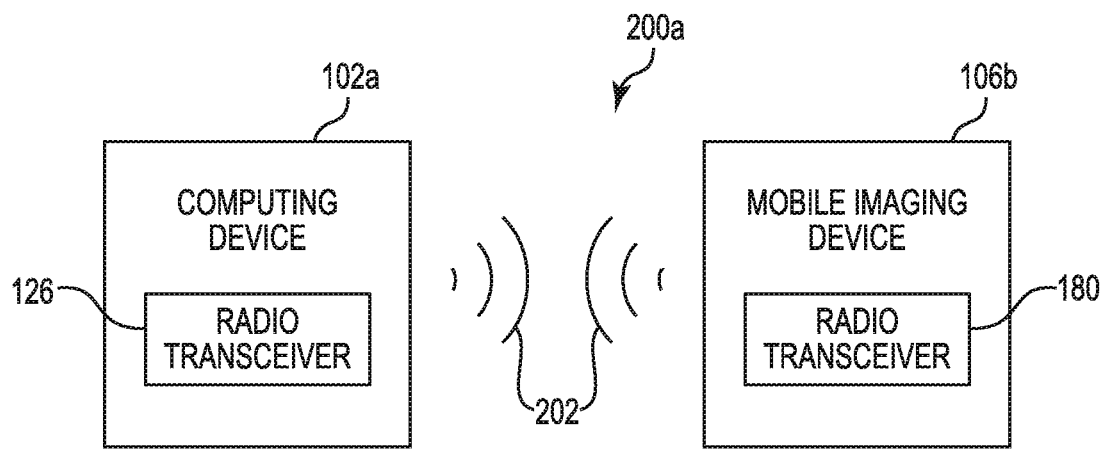
FIG. 4A illustrates one example of a communication link between a computing device and a mobile imaging device.

FIG. 4A illustrates one example of a communication link 202 between a computing device 102a and a mobile imaging device 106b. Computing device 102a is similar to computing device 102 previously described and illustrated with reference to FIG. 2. Mobile imaging device 106b was previously described and illustrated with reference to FIG. 3B. In this example, communication link 202 is a wireless communication link between a radio transceiver 126 of computing device 102a and a radio transceiver 180 of mobile imaging device 106b.

Wireless communication link 202 is a WiFi communication link, a Bluetooth communication link, a NFC communication link, or another suitable wireless communication link. Computing device 102a transmits data to mobile imaging device 106b through wireless communication link 202 for erasing and writing to an e-paper display. Mobile imaging device 106b may transmit data to computing device 102a through wireless communication link 202 indicating the status of mobile imaging device 106b and/or information related to an e-paper display being imaged.

Figure 4B:
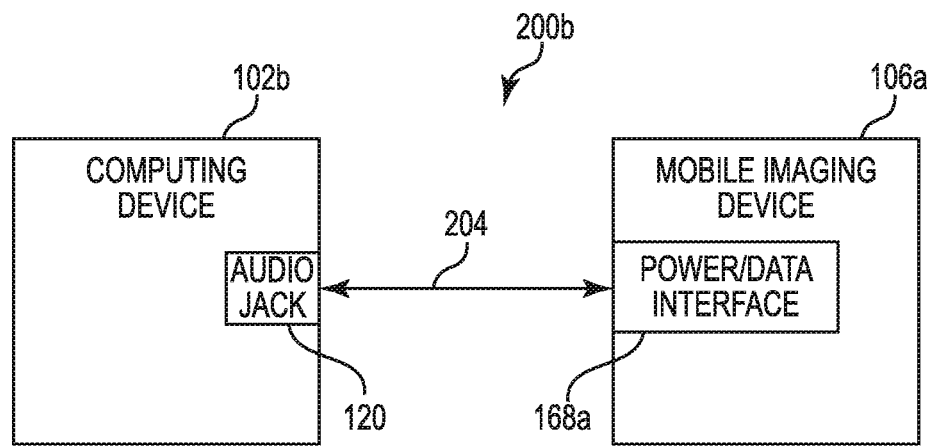
FIG. 4B illustrates another example of a communication link between a computing device and a mobile imaging device.

FIG. 4B illustrates another example of a communication link 204 between a computing device 102b and a mobile imaging device 106a. Computing device 102b is similar to computing device 102 previously described and illustrated with reference to FIG. 2. Mobile imaging device 106a was previously described and illustrated with reference to FIG. 3A. In this example, communication link 204 is a wired communication link between an audio jack 120 of computing device 102b and a power/data interface 168a of mobile imaging device 106a.

Wired communication link 204 is a two wire communication link, a three wire communication link, or another suitable wired communication link. Computing device 102b transmits data to mobile imaging device 106a through wired communication link 204 for erasing and writing to an e-paper display. Mobile imaging device 106a may transmit data to computing device 102b through wired communication link 204 indicating the status of mobile imaging device 106a and/or information related to an e-paper display being imaged.

In one example, a left audio output channel and/or a right audio output channel of audio jack 120 is used to transmit data and/or power from computing device 102b to mobile imaging device 106a. A microphone input channel of audio jack 120 is used to receive data from mobile imaging device 106a. The data may be transmitted on one audio output channel and the power may be transmitted on the other audio output channel, or the data may be combined with the power using frequency modulation of a power carrier signal or other suitable technique.

Figure 4C:
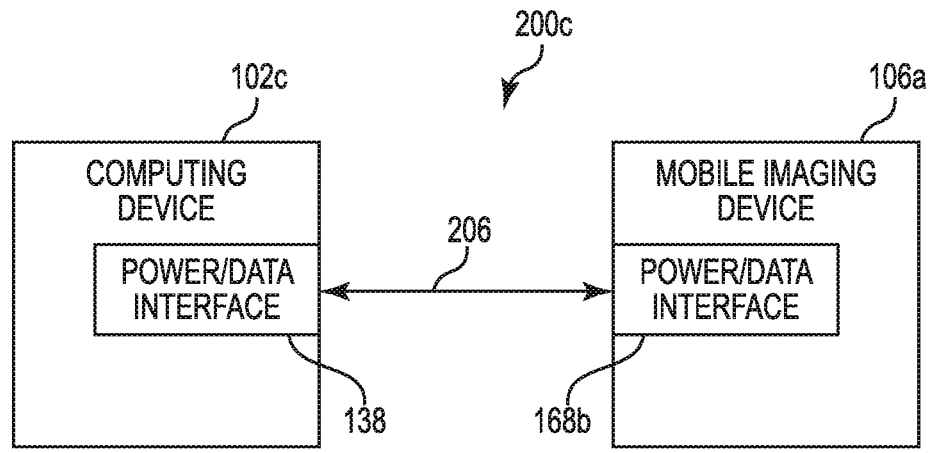
FIG. 4C illustrates another example of a communication link between a computing device and a mobile imaging device.

FIG. 4C illustrates another example of a communication link 206 between a computing device 102c and a mobile imaging device 106a. Computing device 102c is similar to computing device 102 previously described and illustrated with reference to FIG. 2. Mobile imaging device 106a was previously described and illustrated with reference to FIG. 3A. In this example, communication link 206 is a wired communication link between a power/data interface 138 of computing device 102c and a power/data interface 168b of mobile imaging device 106a.

Wired communication link 206 is a USB communication link, a mini USB communication link, or another suitable wired communication link. Computing device 102c transmits data to mobile imaging device 106a through wired communication link 206 for erasing and writing to an e-paper display. Mobile imaging device 106a may transmit data to computing device 102c through wired communication link 206 indicating the status of mobile imaging device 106a and/or information related to an e-paper display being imaged.

Figures 5A, 5B:
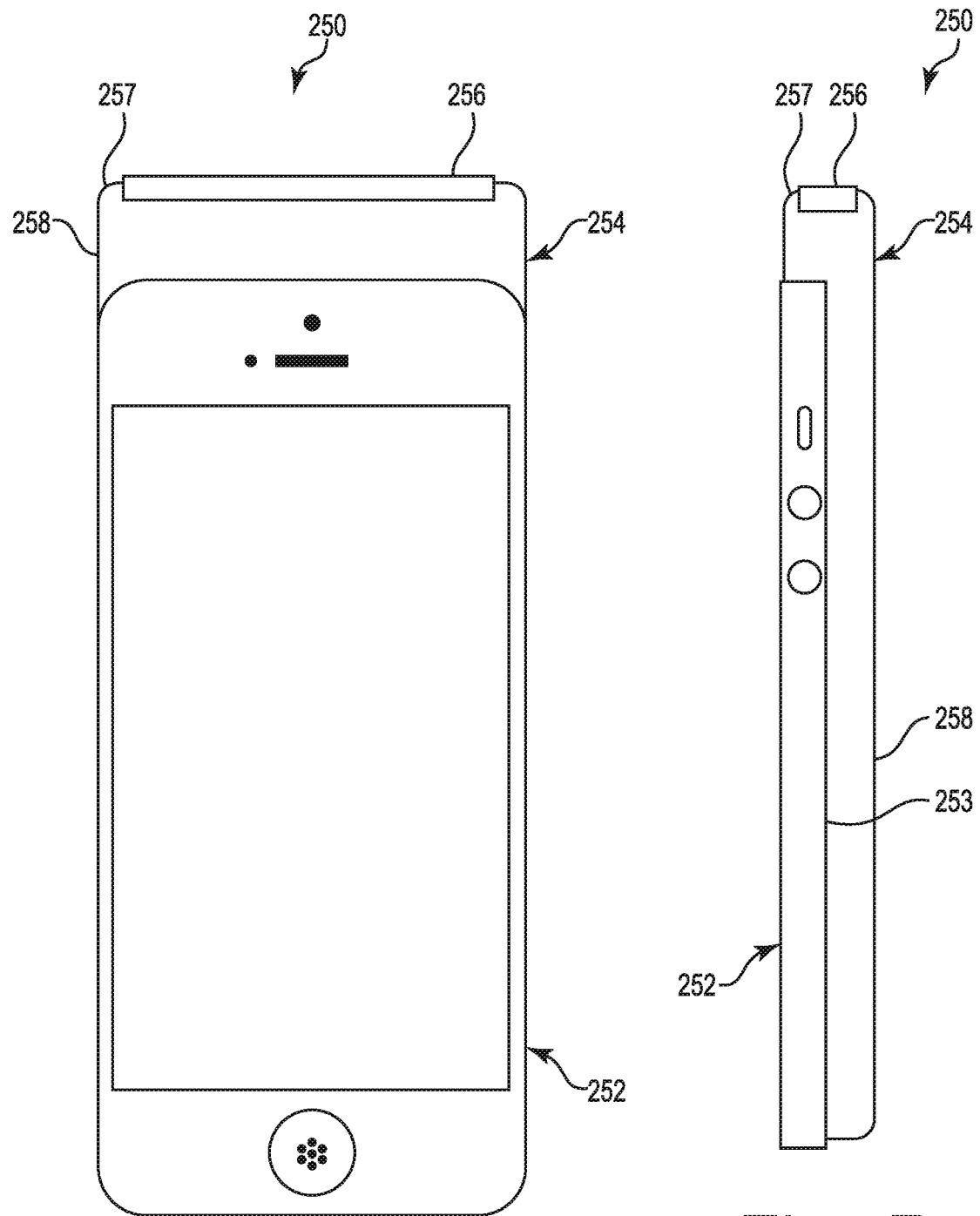
FIGS. 5A-5B illustrate one example of a mobile imaging system including a smartphone with an attached mobile imaging device.

FIG. 5A illustrates a top view and FIG. 5B illustrates a side view of one example of a mobile imaging system 250 including a smartphone 252 with an attached mobile imaging device 254. Smartphone 252 is a handheld computing device similar to computing device 102 previously described and illustrated with reference to FIG. 2. Mobile imaging device 254 is similar to mobile imaging device 106a previously described and illustrated with reference to FIG. 3A. In this example, mobile imaging device 254 is plugged into the audio jack of smartphone 252.

Mobile imaging device 254 includes a housing 258 and an ion source 256 at an end 257 of housing 258 for erasing and writing to an e-paper display. Ion source 256 is addressable and extends across the majority of end 257 of housing 258. Housing 258 complements the shape of smartphone 252 such that the combined smartphone and mobile imaging device system can be easily used with one hand. In one example, housing 258 is removably attached to the back 253 of smartphone 252 using clips, magnets, or other suitable components. Housing 258 encases the electrical components of mobile imaging device 254.

Figure 6:
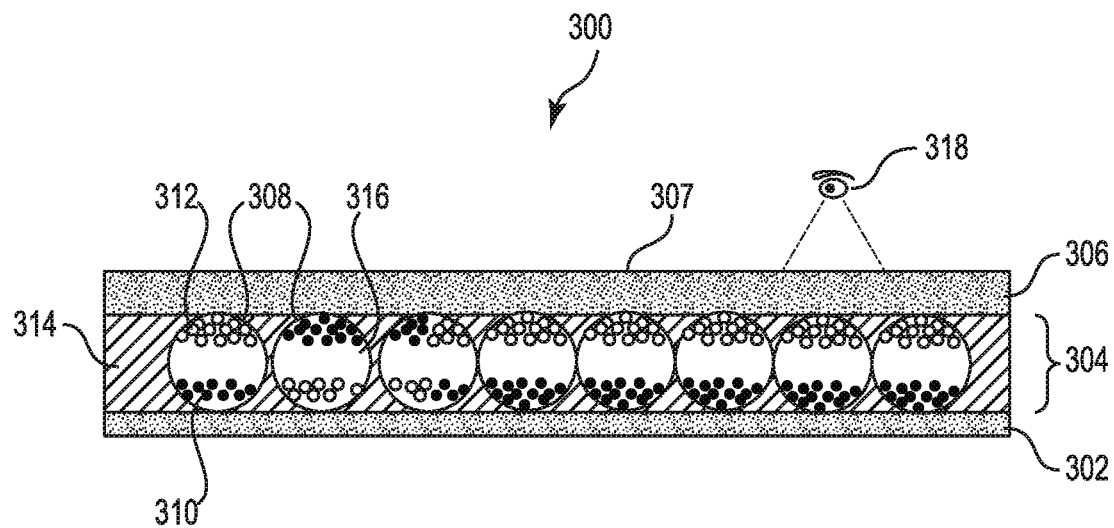
FIG. 6 illustrates a cross-sectional view of one example of an electronic paper ("e-paper") display.

FIG. 6 illustrates a cross-sectional view of one example of an e-paper display 300. In one example, e-paper display 300 is used for e-paper display 110 previously described and illustrated with reference to FIG. 1. E-paper display 300 includes a ground electrode 302, an active layer 304, and a transparent charge receiving layer 306. Active layer 304 includes microcapsules 308 encapsulated by a resin or polymer 314. In one example, each microcapsule 308 includes black particles 310 and white particles 312 suspended in a fluid medium 316. Surface 307 of charge receiving layer 306 provides the imaging surface for e-paper display 300 and is also the viewing side for a viewer 318 in this example.

Ambient light is transmitted through charge receiving layer 306, strikes microcapsules 308, and is reflected back to the viewer 318. When white particles 312 of a microcapsule 308 are located near charge receiving layer 306, the microcapsule appears white to a viewer 318. When black particles 310 of a microcapsule 308 are located near charge receiving layer 306, the microcapsule appears black to the viewer 318. The particles 310 and 312 have opposite charges. For example, black particles 310 can be positively charged particles, and white particles 312 can be negatively charged particles. Various shades of gray can be created by varying the arrangement of alternating microcapsules with white and black particles located near charge receiving layer 306 to produce halftoning.

Microcapsules 308 exhibit image stability using chemical adhesion between particles and/or between the particles and the microcapsule surface. For example, microcapsules 308 can hold text and images indefinitely without using electricity, while allowing the text or images to be changed later.

The structure, materials, and dimensions of the various layers and components of e-paper display 300 can be adapted to specific design criteria. In one example, the transparent charge receiving layer 306 can be composed of a transparent polymer and can have a thickness between 50 µm and 250 µm. The transparent charge receiving layer 306 can also be composed of a material that holds charges or is porous or semi-porous to charges and/or ions.

The diameter of each microcapsule 308 is substantially constant within e-paper display 300 and can be in one example between 20 µm and 100 µm, such as 50 µm. Conductive ground electrode 302 can be composed of a transparent conductive material, such as indium tin oxide, or an opaque material. In one example, ground electrode 302 has a thickness between 10 nm and 1 mm, or larger depending on how e-paper display 300 is to be used.

In other examples, e-paper display 300 has a variety of other configurations. For example, each microcapsule 308 may include black particles suspended in a white colored fluid. The black particles can be positively charged particles or negatively charged particles. One or more microcapsules form a pixel of black and white images displayed on e-paper display 300. The black and white images are created by placing black particles near or away from charge receiving layer 306. For example, the microcapsules with black particles located away from charge receiving layer 306 reflect white light, corresponding to a white portion of an image displayed on e-paper display 300. In contrast, the microcapsules with black particles located near charge receiving layer 306 appear black to a viewer 318 corresponding to a black portion of the image displayed on e-paper display 300. Various shades of gray can be created by using halftoning with black particles located near or away from charge receiving layer 306.

Charge receiving layer 306 may be tinted with alternating blue, red, and green regions. Adjacent blue, red, and green regions form color pixels. Color images are created by placing different combinations of white or black particles near charge receiving layer 306. For example, the microcapsules of a color pixel with white particles located near the red and green regions of charge receiving layer 306 reflect red and green light from e-paper display 300. The viewer 318 will perceive this combination as a yellow pixel. When the black particles in the microcapsules are located near charge receiving layer 306, that color pixel will appear black to the viewer 318. Additionally or alternatively, the black particles 310 of each microcapsule can be replaced by blue, red, or green positively or negatively charged particles. The particles can be used alone or in combination with a tinted charge receiving layer 306 to create a desired color image.

Figure 7:
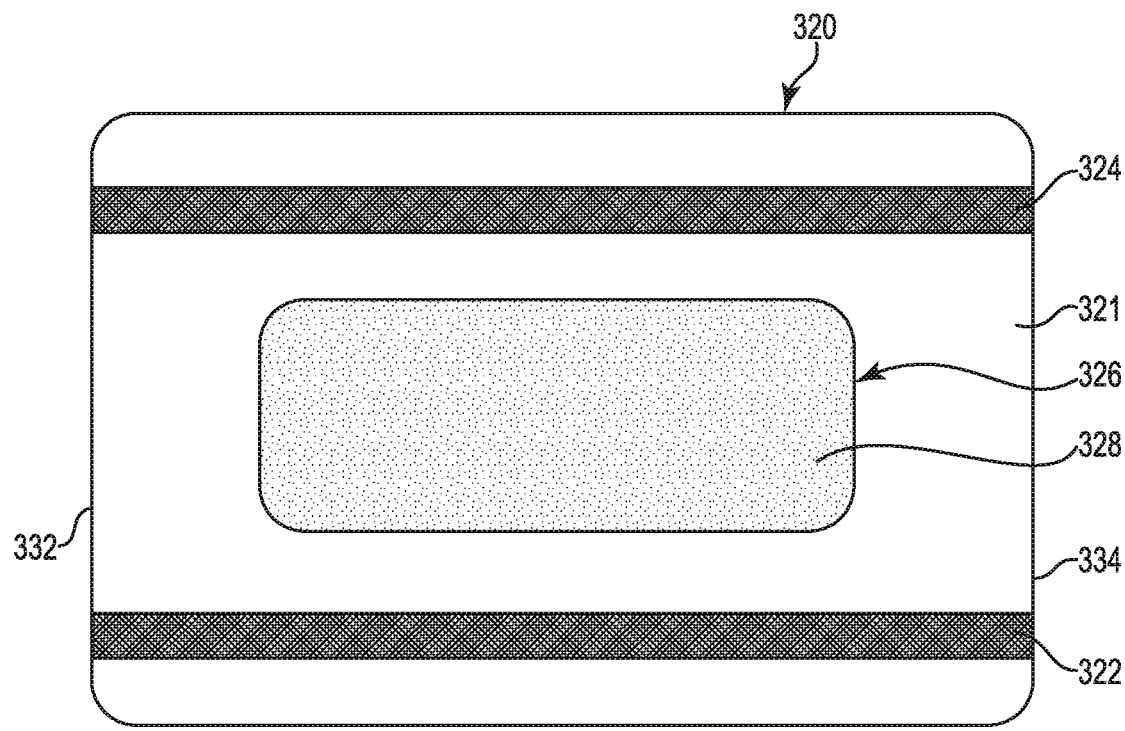
FIG. 7 illustrates a top view of one example of a display device.

FIG. 7 illustrates a top view of one example of a display device 320. Display device 320 includes a support structure 321, an e-paper display 326, a first contact 322, and a second contact 324. First contact 322 is arranged on a surface of support structure 321 and is spaced apart from e-paper display 326. First contact 322 is stripe shaped and extends from a first edge 332 of support structure 321 to a second edge 334 of support structure 321 opposite to the first edge 332. First contact 322 is electrically coupled to a first side of the ground electrode of e-paper display 326.

Second contact 324 is arranged on a surface of support structure 321, on the opposite side of e-paper display 326 from first contact 322, and spaced apart from e-paper display 326. Second contact 324 is stripe shaped and extends from first edge 332 of support structure 321 to second edge 334 of support structure 321 such that second contact 324 is substantially parallel to first contact 322. Second contact 324 is electrically coupled to a second side of the ground electrode of e-paper display 326.

First contact 322 and second contact 324 are parallel to the writing direction of display device 320. In one example, first contact 322 and second contact 324 are embedded within the surface of support structure 321 such that the surface of first contact 322 and the surface of second contact 324 are recessed with respect to the surface of support structure 321. The recessed contacts can be used for guiding and aligning a mobile imaging device with display device 320 during erasing and writing to display device 320. In this example, first contact 322, second contact 324, and an imaging surface 328 of e-paper display 326 are on the same side of display device 320. In other examples, first contact 322, second contact 324, and/or imaging surface 328 of e-paper display 326 can be on opposite sides of display device 320.

First contact 322 and/or second contact 324 are likely to be contacted by a user when display device 320 is handled. This contact between a user and first contact 322 and/or second contact 324 provides a positive consequence in that if the user is storing any electrostatic charge, display device 320 will be equipotential with the user, thus minimizing the chance of accidental image modifications due to electrostatic discharges.

Figures 8A, 8B:
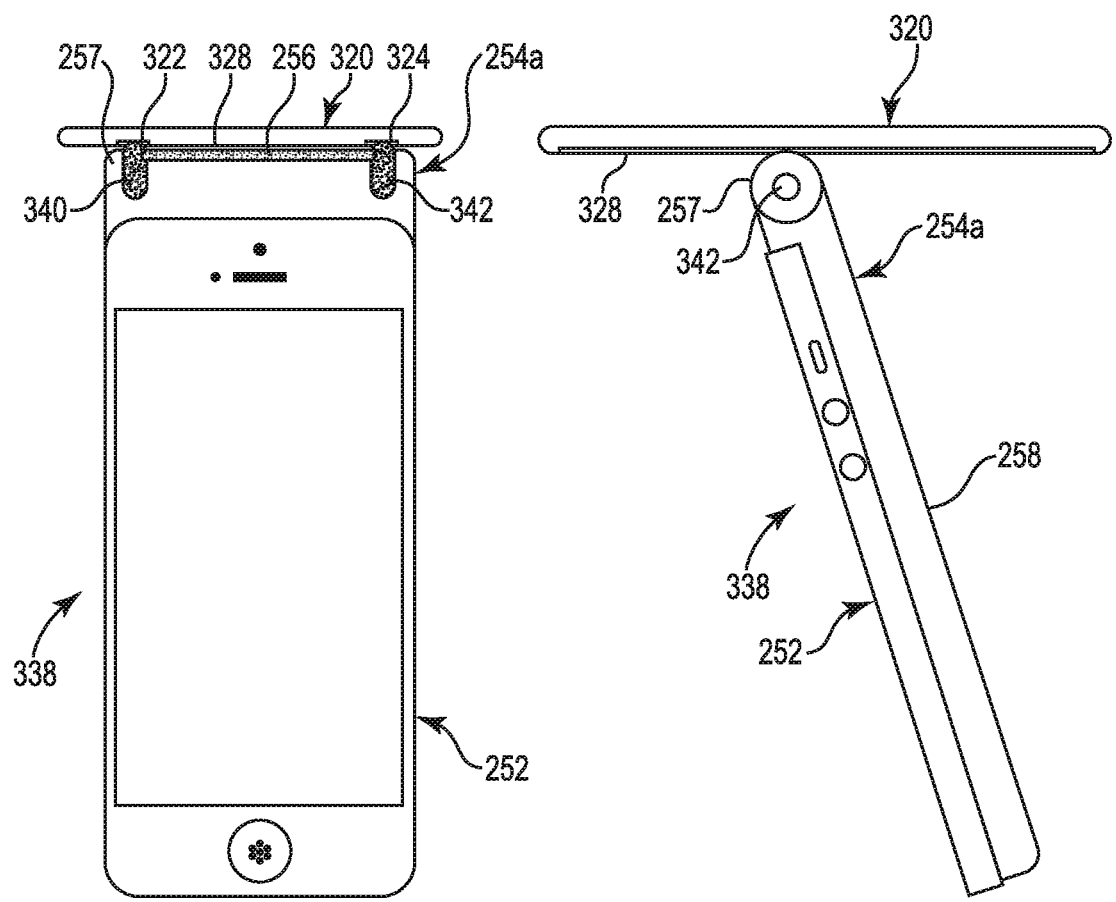
FIGS. 8A-8C illustrate one example of a mobile imaging system during erasing or writing to a display device.
Figure 8C:
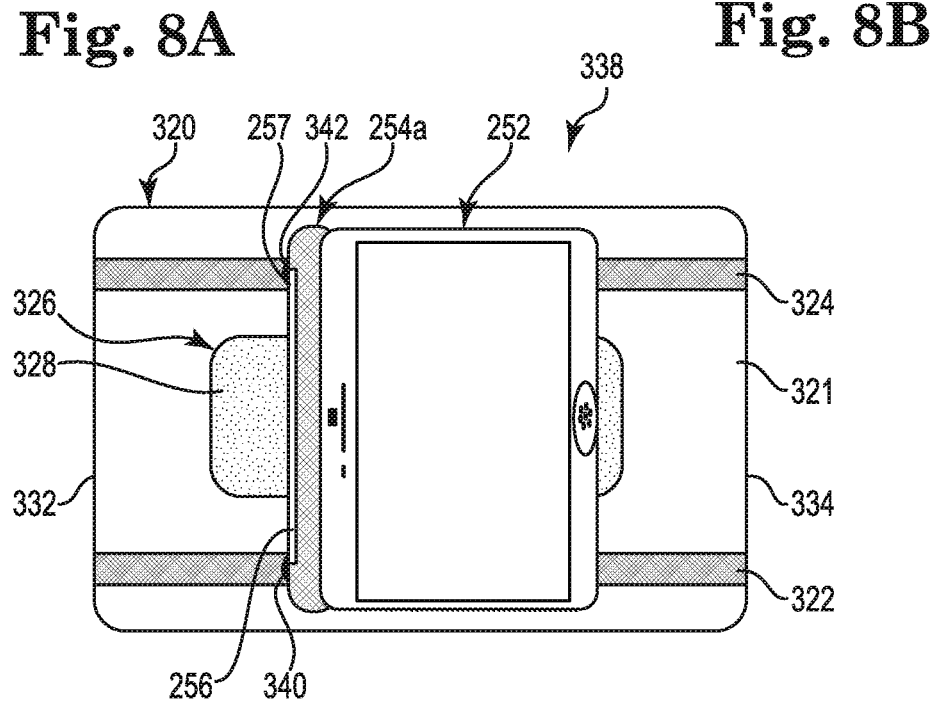

FIGS. 8A-8C illustrate one example of a mobile imaging system 338 during erasing or writing to a display device 320. Display device 320 was previously described and illustrated with reference to FIG. 7. Display device 320 includes recessed contacts 322 and 324 and e-paper display 326 including an imaging surface 328. Mobile imaging system 338 includes a smartphone 252 with an attached mobile imaging device 254a. Mobile imaging device 254a is similar to mobile imaging device 254 previously described and illustrated with reference to FIGS. 5A-5B, except that mobile imaging device 254a includes a first conductive roller 340 and a second conductive roller 342.

First conductive roller 340 is arranged on a first side of ion source 256 at end 257 of housing 258 of mobile imaging device 254a, and second conductive roller 342 is arranged on a second side of ion source 256 at end 257 of housing 258 opposite to the first side. In one example, conductive rollers 340 and 342 are partially enclosed by housing 258 and set the spacing between ion source 256 and display device 320 during erasing and writing to display device 320. Conductive rollers 340 and 342 are composed of any suitable electrically conductive material, such as a metal or conductive rubber. Conductive rollers 340 and 342 provide ground return path connectors for mobile imaging device 254a. In one example, each conductive roller 340 and 342 is equipped with a rotary encoder to sense the incremental position of ion source 256 of mobile imaging device 254a relative to display device 320 during erasing and writing to display device 320.

In another example, conductive rollers 340 and 342 are replaced by conductive sliding contacts. The conductive sliding contacts are used to set the spacing between ion source 256 and display device 320 during erasing and writing to display device 320. The conductive sliding contacts are composed of a metallic spacer coated with a low friction conductive coating or other suitable conductive material.

To write to display device 320, mobile imaging system 338 is brought into contact with display device 320 so that first conductive roller 340 contacts first contact 322 and second conductive roller 342 contacts second contact 324 as best illustrated in FIGS. 8A and 8C. Conductive rollers 340 and 342 electrically couple mobile imaging device 254a to the ground return path of display device 320 through first contact 322 and second contact 324.

Mobile imaging system 338 is moved across display device 320 to erase and write to e-paper display 326. In one example, mobile imaging system 338 is moved in a first direction across display device 320 to erase e-paper display 326 and is moved in a second direction, opposite to the first direction, across display device 320 to write to e-paper display 326. In other examples, erasing or writing to display device 320 is selected using another suitable method, such as by pressing a button, saying a voice command, or performing a gesture via smartphone 252. While mobile imaging system 338 is moved across display device 320, conductive rollers 340 and 342 maintain an electrical connection to first contact 322 and second contact 324 during the erasing and writing of e-paper display 326.

In this example, e-paper display 326 of display device 320 includes microcapsules including positively charged black particles and negatively charged white particles. Ion source 256 erases any information stored in the microcapsules in a first pass across display device 320 prior to writing information with ion source 256 during a second pass across display device 320. As display device 320 passes over mobile imaging device 254a in a first pass, ion source 256 ejects negative ions onto imaging surface 328. The negative ions repel negatively charged white particles away from imaging surface 328 and attract positively charged black particles toward imaging surface 328. By passing ion source 256 over imaging surface 328, any information previously written to display device 320 is erased by positioning the positively charged black particles near the top of the microcapsules and pushing the negatively charged white particles to the bottom of the microcapsules.

Ion source 256 writes information to the microcapsules in a second pass of mobile imaging system 338 over display device 320. As display device 320 passes over mobile imaging device 254a, ion source 256 selectively ejects positive ions toward imaging surface 328 when a region of display device 320 is to be changed from black to white. The positive ions repel positively charged black particles away from imaging surface 328 and attract negatively charged white particles toward imaging surface 328. By passing ion source 256 over imaging surface 328 and selectively ejecting positive ions onto imaging surface 328, information is written to display device 320 by selectively positioning negatively charged white particles near the top of the microcapsules and selectively pushing the positively charged black particles to the bottom of the microcapsules.

Figure 9A:
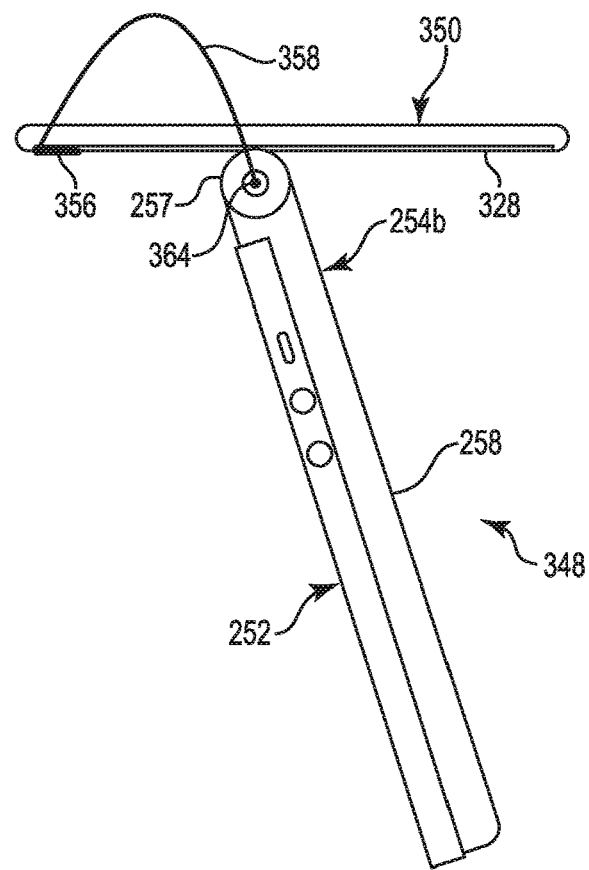
FIGS. 9A-9B illustrate another example of a mobile imaging system during erasing or writing to a display device.
Figure 9B:
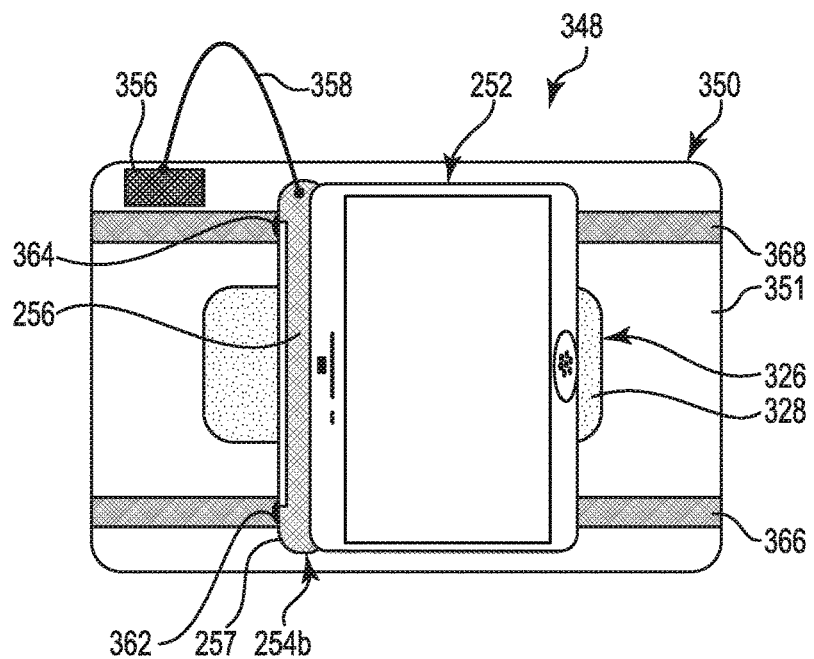

FIGS. 9A-9B illustrate another example of a mobile imaging system 348 during erasing or writing to a display device 350. Display device 350 is similar to display device 320 previously described and illustrated with reference to FIG. 7, except that display device 350 includes a ground pad 356 and guides 366 and 368 in place of contacts 322 and 324. Ground pad 356 is electrically coupled to the ground electrode of e-paper display 326. Guides 366 and 368 are recessed with respect to the surface of support structure 351. The guides 366 and 368 are used for guiding and aligning mobile imaging device 254b with display device 350 during erasing and writing to display device 350.

Mobile imaging system 348 includes a smartphone 252 with an attached mobile imaging device 254b. Mobile imaging device 254b is similar to mobile imaging device 254 previously described and illustrated with reference to FIGS. 5A-5B, except that mobile imaging device 254b includes a ground connector 358, a first roller 362, and a second roller 364. Ground connector 358 provides a connection to the ground return path of display device 350 during erasing and writing to display device 350. To erase or write to display device 350, ground connector 358 is connected to ground pad 356 of display device 350 using a clip or other suitable connection mechanism. Once erasing and/or writing to display device 350 is complete, ground connector 358 can be easily removed from ground pad 356. Ground connector 358 is composed of a flexible wire or other suitable flexible connector.

First roller 362 is arranged on a first side of ion source 256 at end 257 of housing 258 of mobile imaging device 254b, and second roller 264 is arranged on a second side of ion source 256 at end 257 of housing 258 opposite to the first side. In one example, rollers 362 and 364 are partially enclosed by housing 258 and set the spacing between ion source 256 and display device 350 during erasing and writing to display device 350. Rollers 362 and 364 are composed of any suitable material, such as a metal, a rubber, or a polymer. In one example, each roller 362 and 364 is equipped with a rotary encoder to sense the incremental position of ion source 256 of mobile imaging device 254b relative to display device 350 during erasing and writing to display device 350.

To write to display device 350, mobile imaging system 348 is brought into contact with display device 350 so that first roller 362 contacts guide 366 and second roller 364 contacts guide 368 as best illustrated in FIG. 9B. Mobile imaging system 348 writes to display device 350 similarly to mobile imaging system 338 previously described and illustrated with reference to FIGS. 8A-8C.

Figure 10A:
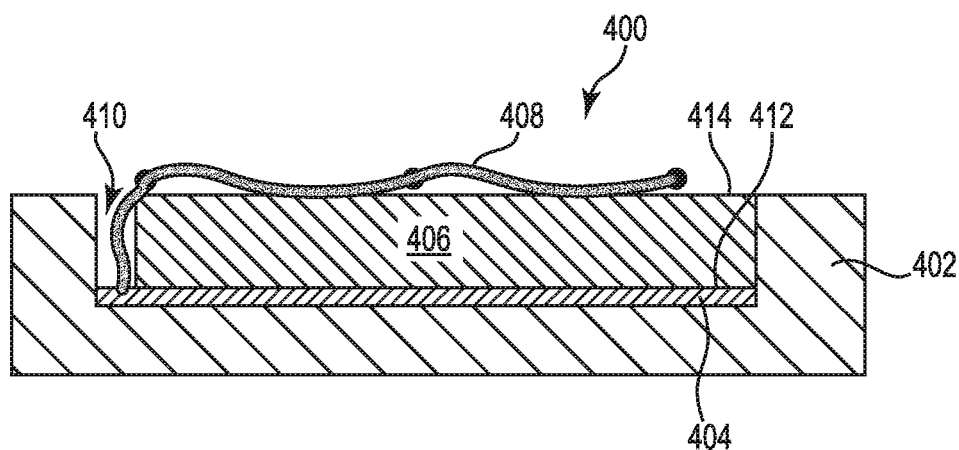
FIG. 10A illustrates a cross-sectional view of another example of a display device.
Figure 10B:
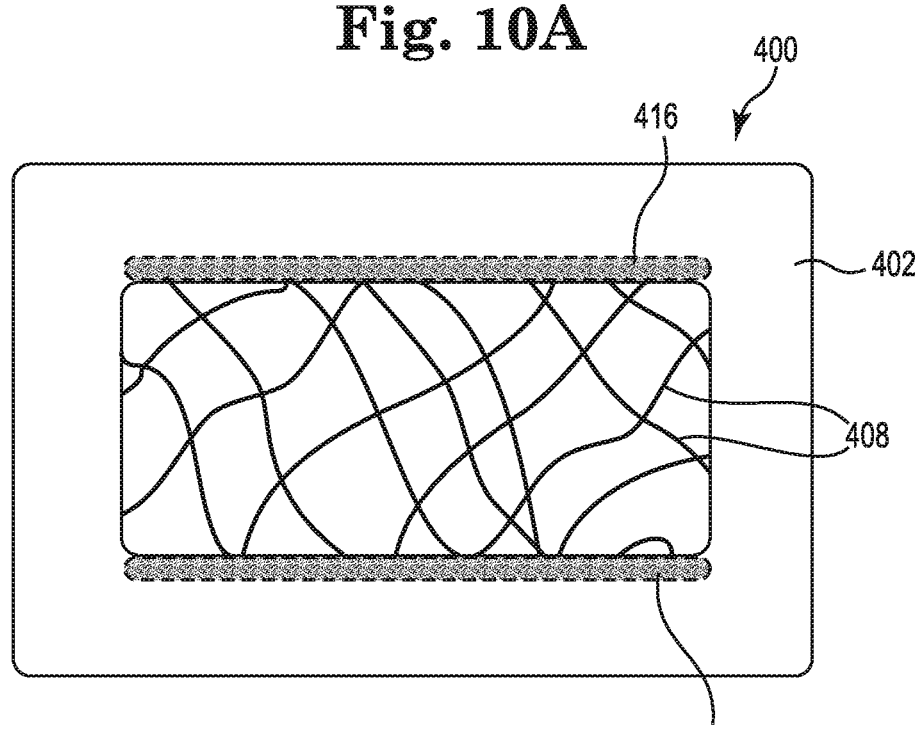
FIG. 10B illustrates a top view of one example of the display device illustrated in FIG. 10A.

FIG. 10A illustrates a cross-sectional view and FIG. 10B illustrates a top view of another example of a display device 400. Display device 400 includes a support structure 402, a ground electrode 404, ground electrode bars 416 (indicated by dashed lines since the ground electrode bars are not visible in the top view), an e-paper display 406, and a network of conductors 408. E-paper display 406 includes an imaging surface 414 and a surface 412 opposite to imaging surface 414. Surface 412 contacts ground electrode 404. Ground electrode 404 and e-paper display 406 are mounted in support structure 402 such that imaging surface 414 of e-paper display 406 is exposed. Network of conductors 408 is arranged on imaging surface 414 of e-paper display 406 and electrically coupled to ground electrode 404 at an edge region 410 of e-paper display 406 and/or to ground electrode 404 through ground electrode bars 416 arranged on opposite sides of e-paper display 406. Ground electrode bars 416 are electrically coupled to ground electrode 404.

E-paper display 406 includes an active layer that switches color when a magnetic field or electrical charges are applied to imaging surface 414. In one example, the active layer contains a switchable pigment or die combination. A resin or polymer may be used to encapsulate the active layer. In addition, e-paper 406 may include a functional coating on imaging surface 414. In one example, e-paper display 406 has a thickness between 70 µm and 300 µm.

Ground electrode 404 provides a counter-electrode for the imaging of e-paper display 406 by a mobile imaging device. Ground electrode 404 along with network of conductors 408 allow counter charges to flow to ground electrode 404 from a mobile imaging device. Ground electrode 404 can be composed of a transparent conductive material, such as indium tin oxide, or an opaque conductive material. In one example, ground electrode 404 has a thickness between 5 nm and 1 mm.

Support structure 402 can be composed of a transparent material or an opaque material. Support structure 402 can be composed of polyester, plastic, glass, transparent Mylar, or other suitable material. In one example, support structure 402 is shaped to provide a display device 400 in the form of a gift card, prepaid card, credit card, shelf tag, boarding pass, or shipping label.

Network of conductors 408 is an ordered mesh or a random mesh of conductive strands extending over imaging surface 414 of e-paper display 406. The ordered mesh can be in a grid or crisscross pattern, a parallel line pattern, or another suitable pattern. The random mesh can be in a crisscross arrangement as illustrated in FIG. 10B or another suitable arrangement. In one example, the conductive strands are metallic wires partially embedded in a top protective coating of e-paper display 406. In another example, the conductive strands are carbon fibers or a printed layer (e.g., digitally printed or screen printed) of conductive ink on the imaging surface 414 of e-paper display 406. The printed conductive ink may be transparent if imaging surface 414 is also the viewing surface of e-paper display 406. In one example, the conductive strands have a thickness or width less than 20 µm.

The conductive strands of network of conductors 408 have a spatial frequency in a range between 500 µm and several millimeters in one example. The low spatial frequency ensures minimal interference with the imaging process since the areas of e-paper display 406 covered by a conductive strand may not image the same as the rest of e-paper display 406. In addition, the low spatial frequency is sufficient to make an electrical connection with an electrode of a mobile imaging device. While the conductive mesh of network of conductors 408 is illustrated diagonally and semi-randomly in FIG. 10B, the particular arrangement can vary as long as the width of the conductors is sufficient to carry the current and the spatial frequency of the conductors is sufficient to maintain contact to an electrode of a mobile imaging device.

Figure 11:
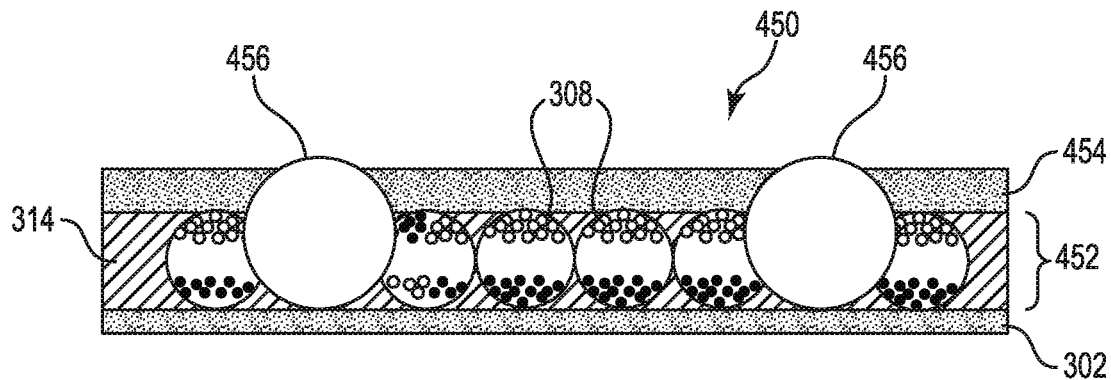
FIG. 11 illustrates a cross-sectional view of another example of a display device.

FIG. 11 illustrates a cross-sectional view of another example of a display device 450. Display device 450 includes a ground electrode 302, an active layer 452, and a charge receiving layer 454. Active layer 452 includes microcapsules 308 encapsulated by a resin or polymer 314 as previously described and illustrated with reference to FIG. 6. In addition, active layer 452 includes a plurality of spaced apart conductive spheres 456 that extend through charge receiving layer 454 and active layer 452 to electrically contact ground electrode 302. In this example, conductive spheres 456 provide a connection to ground electrode 302 during erasing and writing of e-paper display 450 via a mobile imaging device.

Conductive spheres 456 have a diameter larger than the diameter of microcapsules 308 such that a portion of each conductive sphere extends through charge receiving layer 454. In one example, conductive spheres 456 are composed of a metal or other suitable electrically conductive material. Conductive spheres 456 are dispersed with microcapsules 308 in the proper proportion to have a spatial frequency in a range between 2.5 mm and 15 mm. The conductive spheres can be arranged randomly within active layer 452 or in a pattern as long as the desired spatial frequency is provided.

In other examples, conductive spheres 456 could be replaced by conductive elements having another suitable shape, such as a cuboid, cylinder, pyramid, or prism shape.

In another example, conductive spheres 456 could be replaced by conductive paths formed by locally increasing the conductivity of resin or polymer 314. Conductive spheres 456 could also be combined with network of conductors 408 previously described and illustrated with reference to FIGS. 10A-10B.

Figure 12:
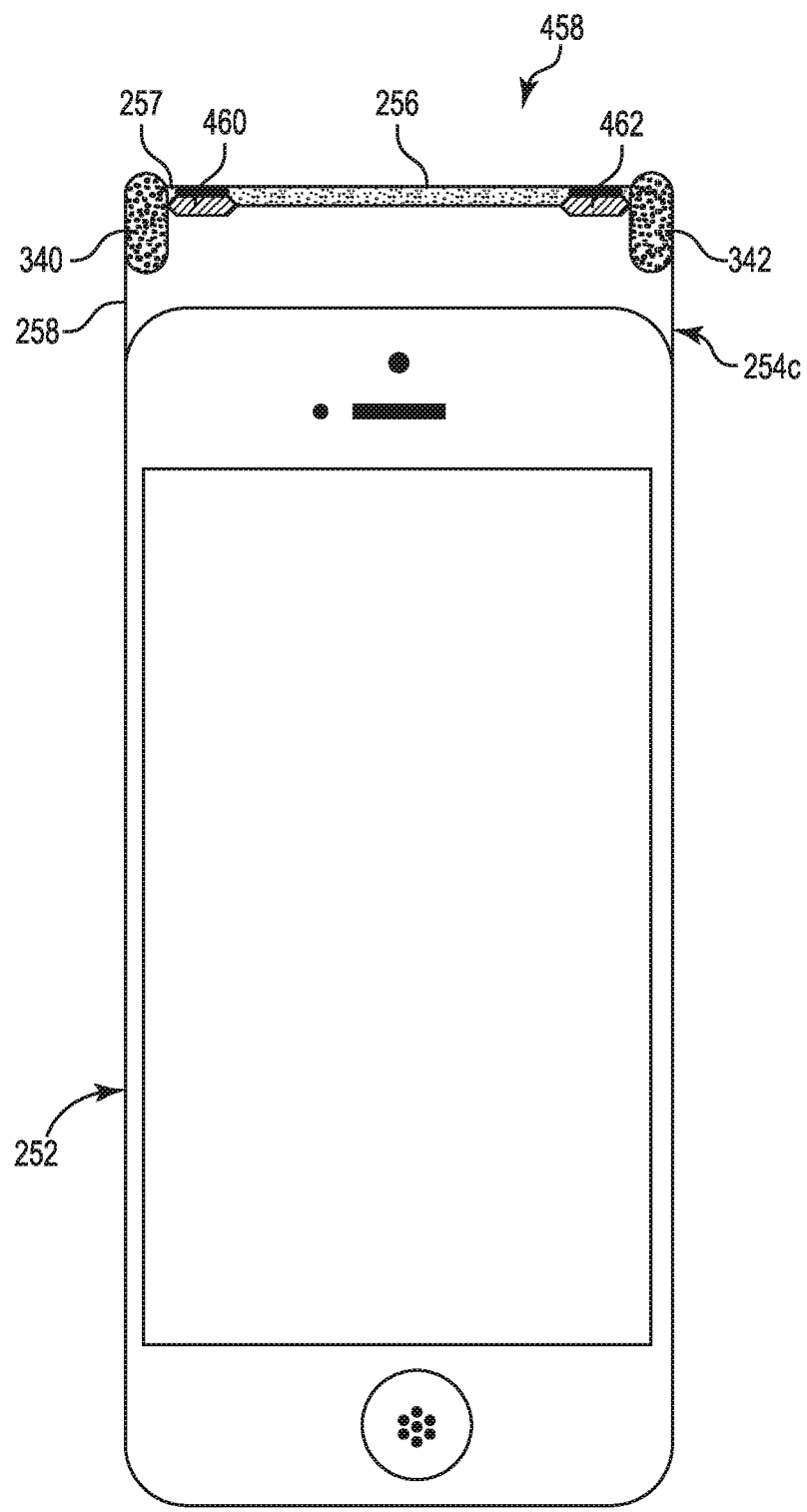
FIG. 12 illustrates another example of a mobile imaging system including a smartphone with an attached mobile imaging device.

FIG. 12 illustrates another example of a mobile imaging system 458 including a smartphone 252 with an attached mobile imaging device 254c. In one example, mobile imaging system 458 can be used to erase and write to display device 400 previously described and illustrated with reference to FIGS. 10A-10B or display device 450 previously described and illustrated with reference to FIG. 11. Mobile imaging device 254c is similar to mobile imaging device 254a previously described and illustrated with reference to FIGS. 8A-8C, except that mobile imaging device 254c includes first CCD camera 460 and second CCD camera 462. In this example, conductive rollers 340 and 342 maintain an electrical connection to the ground return path of a display device during erasing or writing to the display device. The conductive rollers 340 and 342 contact the network of conductors on the imaging surface of the display device or contact the conductive elements extending through the charge receiving layer and the active layer of the display device.

First CCD camera 460 is arranged between a first side of ion source 256 and first conductive roller 340 at end 257 of housing 258, and second CCD camera 462 is arranged between a second side of ion source 256 and second conductive roller 342. CCD cameras 460 and 462 are used for optical navigation of an e-paper display. CCD cameras 460 and 462 sense the incremental position and rotation of ion source 256 of mobile imaging device 254c as mobile imaging device 254c is moved across an e-paper display. In one example, an e-paper display may include non-visible markings (e.g., markings visible in IR range) to provide a pattern that can be used to sense the position of mobile imaging device 254c relative to the e-paper display.

FIG. 13A illustrates another example of a mobile imaging system 468 including a smartphone 252 with an attached mobile imaging device 254d. FIG. 13B illustrates an exploded view of a portion of mobile imaging device 254d. In one example, display device 470 is similar to display device 400 previously described and illustrated with reference to FIGS. 10A-10B or display device 450 previously described and illustrated with reference to FIG. 11. Mobile imaging device 254d is similar to mobile imaging device 254a previously described and illustrated with reference to FIGS. 8A-8C, except that mobile imaging device 254d includes first capacitive sensor 474 and second capacitive sensor 476.

First capacitive sensor 474 is arranged on one side of ion source 256 at end 257 of housing 258 between rollers 340 and 342, and second capacitive sensor 476 is arranged on the other side of ion source 256 at end 257 of housing 258 between rollers 340 and 342. Capacitive sensors 474 and 476 sense the tilt of ion source 256 with respect to display device 470. The sensed tilt can be used to compensate for current from different areas of ion source 256 that may have different spacings to the ground return path of display device 470 and thus different extraction fields.

Figure 14A:
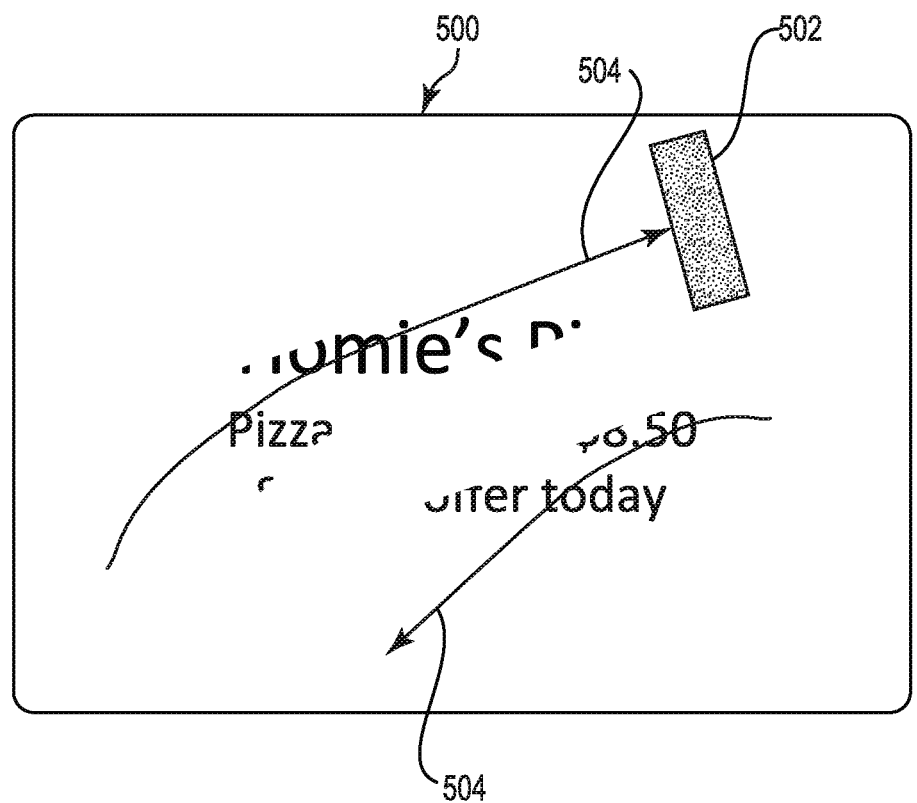
FIG. 14A illustrates one example of a display device being imaged by a mobile imaging device.

FIG. 14A illustrates one example of a display device 500 being imaged by a mobile imaging device 502. In this example, mobile imaging device 502 is a stand alone mobile imaging device, such as mobile imaging device 106b previously described and illustrated with reference to FIG. 3B. Mobile imaging device 502 can be handheld. Mobile imaging device 502 is smaller than the display device 500. The path of writing is indicated by arrows 504 and can be random. Display device 500 is a large format display and includes a network of conductors to provide a connection to the ground electrode from mobile imaging device 502 as previously described and illustrated with reference to FIG. 10A-10B or 11. The network of conductors on the imaging surface of display device 500 enables a continuous electrical connection between mobile imaging device 502 and the ground electrode of the display device as the mobile imaging device is moved across the display device.

Imaged features, (i.e., either permanent such as dot patterns or features present in the image existing in the display device itself) can be used together with CCD cameras as previously described and illustrated with reference to FIG. 12 to provide position feedback so that the information displayed on display device 500 can be updated by scanning mobile imaging device 502 across the display device in a non-predetermined path. Alternatively, mobile imaging device 502 can use optical mouse scanning technology and navigate its position by detecting the rate of motion from the surface topography of the display device 500. In a further example, display device 500 can be marked with IR, UV, or fluorescent dot patterns that can be used to determine the position and orientation of mobile imaging device 502 relative to display device 500.

Figure 14B:
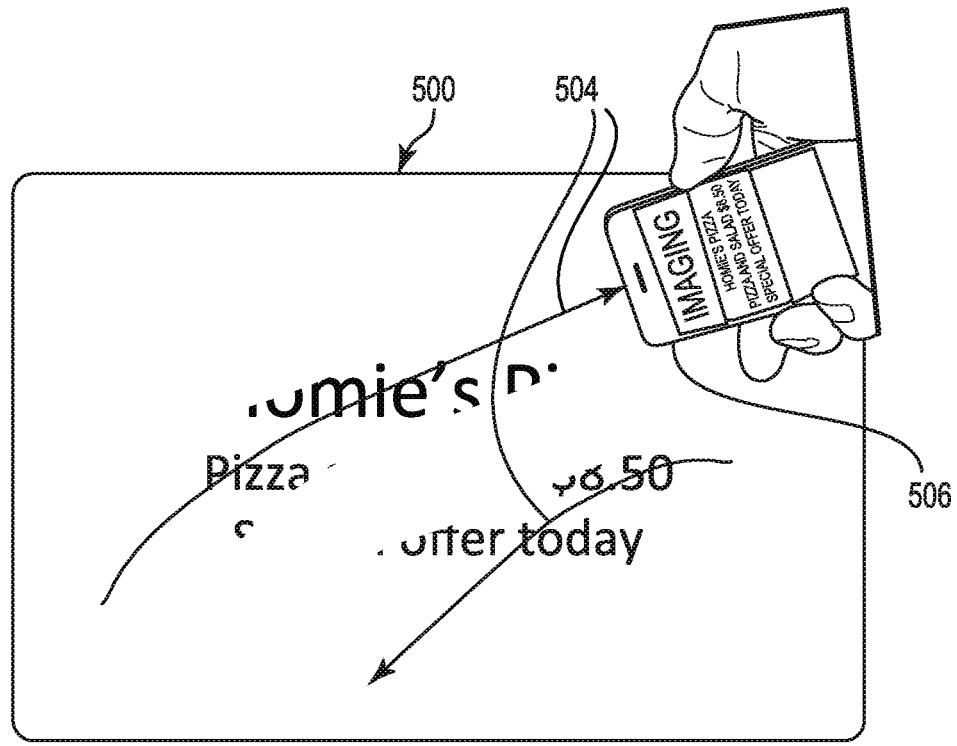
FIG. 14B illustrates another example of a display device being imaged by a mobile imaging system.

FIG. 14B illustrates another example of display device 500 being imaged by a mobile imaging system 506. In this example, mobile imaging system 506 includes a computing device, such as computing device 102 previously described and illustrated with reference to FIG. 2, with an attached mobile imaging device, such as mobile imaging device 106a previously described and illustrated with reference to FIG. 3A. Mobile imaging system 506 can be handheld. Mobile imaging system 506 writes to display device 500 similarly to mobile imaging device 502 previously described and illustrated with reference to FIG. 14A.

FIG. 15A illustrates one example of a mobile imaging system 518 including a smartphone 252 with a separate mobile imaging device 520. Smartphone 252 is communicatively coupled to mobile imaging device 520 through a wireless communication link 521. Mobile imaging device 520 includes an ion source 256, conductive rollers 340 and 342, and CCD cameras 460 and 462 as previously described.

Smartphone 252 includes a mobile imaging application 522. In this example, mobile imaging application 522 includes an image button 523, an erase button 524, a preview window 525, and an edit image button 526. Preview window 525 displays a preview of content to be written to an e-paper display by mobile imaging device 520. In response to a user pressing the image button 523, smartphone 252 transmits write data to mobile imaging device 520 through wireless communication link 521. The write data provides the information mobile imaging device 520 uses to control ion source 256 to write the content to a display device. In response to a user pressing the erase button 524, smartphone 252 transmits erase data to mobile imaging device 520 through wireless communication link 521. The erase data provides the information mobile imaging device 520 uses to control ion source 256 to erase the content of a display device. In response to a user pressing the edit image button 526, the user may edit the content in preview window 525 or load a different image.

FIG. 15B illustrates one example of mobile imaging device 520 during erasing or writing. Once mobile imaging device 520 receives write data or erase data from smartphone 252, mobile imaging device 520 is brought into contact with a display device 530. Mobile imaging device 520 erases or writes to display device 520 by ejecting appropriate charges onto an imaging surface 532 of the display device as the mobile imaging device is moved across the display device. In one example, ion source 256 is not powered on until a connection to the ground return path of display device 530 is detected through conductive rollers 340 and 342.

FIG. 15C illustrates one example of display device 530 after writing. Mobile imaging device 520 writes the content to display device 530. After writing, display device 530 includes content 534, which matches the content displayed in preview window 525 of mobile imaging application 522 previously described and illustrated with reference to FIG. 15A.

Example mobile imaging devices as described herein can be used in a variety of mobile applications. The mobile imaging devices may be directly connected to a handheld computing device, such as a smartphone, or may be separate handheld devices. The mobile imaging devices can be used to erase or write to a variety of differently configured e-paper display devices.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A mobile imaging device comprising:
a housing for removably attaching to a computing device;
a single ion source at an end of the housing, the ion source to erase and write to an electronic paper display by depositing charges onto an imaging surface of the electronic paper display as the imaging device and the electronic paper display are moved relative to each other, the electronic paper display including a ground return path;
a first conductive roller on a first side of the ion source and a second conductive roller on a second side of the ion source opposite to the first side, the first conductive roller and the second conductive roller to maintain a connection to the ground return path while the imaging device and the electronic paper display are moved relative to each other during erasing or writing to the electronic paper display; and
an interface to communicate with the computing device.

2. The mobile imaging device of claim 1, wherein the first conductive roller and the second conductive roller set a spacing between the ion source and the electronic paper display as the imaging device and the electronic paper display are moved relative to each other during erasing or writing to the electronic paper display.

3. The mobile imaging device of claim 1, wherein the first conductive roller and the second conductive roller each include a rotary encoder to sense incremental position as the imaging device and the electronic paper display are moved relative to each other during erasing or writing to the electronic paper display.

4. The mobile imaging device of claim 1, wherein the interface is to provide power to the imaging device.

5. The mobile imaging device of claim 1, further comprising:
a battery within the housing to power the imaging device.

6. The mobile imaging device of claim 1, wherein the interface comprises a wireless communication link.

7. The mobile imaging device of claim 1, wherein the interface comprises a wired communication link.

8. The mobile imaging device of claim 1, further comprising:
a positioning system to track a position of the ion source relative to the electronic paper display as the imaging device and the electronic paper display are moved relative to each other during erasing or writing to the electronic paper display.

9. The mobile imaging device of claim 1, wherein the mobile imaging device is communicatively coupled to an audio jack of the computing device.

10. A mobile imaging device comprising:
a single ion source to be set to a first potential to erase an electronic paper display by depositing first charges onto an imaging surface of the electronic paper display as the imaging device and the electronic paper display are moved relative to each other and to be set to a second potential to write to the electronic paper display by depositing second charges onto the imaging surface of the electronic paper display as the imaging device and the electronic paper display are moved relative to each other, the electronic paper display including a ground return path;
a ground connector to maintain an electrical connection to the ground return path as the imaging device and the electronic paper display are moved relative to each other during erasing or writing to the electronic paper display; and
a positioning system to track a position of the ion source relative to the electronic paper display as the imaging device and the electronic paper display are moved relative to each other during erasing or writing to the electronic paper display.

11. The mobile imaging device of claim 10, further comprising:
an interface for transferring data between the imaging device and a computing device.

12. The mobile imaging device of claim 11, wherein the interface comprises a wireless communication link.

13. The mobile imaging device of claim 11, wherein the interface comprises a wired communication link.

14. The mobile imaging device of claim 11, wherein the interface is to provide power to the imaging device.

15. The mobile imaging device of claim 10, wherein the positioning system comprises a first CCD camera on a first side of the ion source and a second CCD camera on a second side of the ion source opposite to the first side, the first CCD camera and the second CCD camera for optically sensing an incremental position and rotation of the ion source relative to the electronic paper display as the imaging device and the electronic paper display are moved relative to each other during erasing or writing to the electronic paper display.

16. The mobile imaging device of claim 10, wherein the positioning system comprises a first capacitive sensor on a first side of the ion source and a second capacitive sensor on a second side of the ion source opposite to the first side, the first capacitive sensor and the second capacitive sensor to sense tilt between the ion source and the electronic paper display as the imaging device and the electronic paper display are moved relative to each other during erasing or writing to the electronic paper display.

17. The mobile imaging device of claim 10, further comprising:

a housing for removably attaching to a handheld computing device,
wherein the mobile imaging device is communicatively coupled to an audio jack of the handheld computing device.

18. The mobile imaging device of claim 17, further comprising:
a battery within the housing to power the imaging device.

19. The mobile imaging device of claim 10, wherein the ground connector comprises a conductive roller.

20. The mobile imaging device of claim 10, wherein the ground connector comprises a flexible wire.

* * * * *